US010456965B2

(12) United States Patent
Tatsuno et al.

(10) Patent No.: US 10,456,965 B2
(45) Date of Patent: Oct. 29, 2019

(54) METHOD OF MANUFACTURING A COMPOSITE

(71) Applicant: Enplas Corporation, Saitama (JP)

(72) Inventors: Shuji Tatsuno, Saitama (JP); Hiroshi Motoki, Saitama (JP); Tomohiro Saito, Saitama (JP); Yuya Oshima, Saitama (JP)

(73) Assignee: Enplas Corporation, Saitama (JP)

(*) Notice: Subject to any disclaimer, the term of this patent is extended or adjusted under 35 U.S.C. 154(b) by 90 days.

(21) Appl. No.: 15/551,777

(22) PCT Filed: Jan. 19, 2016

(86) PCT No.: PCT/JP2016/051367
§ 371 (c)(1),
(2) Date: Aug. 17, 2017

(87) PCT Pub. No.: WO2016/132794
PCT Pub. Date: Aug. 25, 2016

(65) Prior Publication Data
US 2018/0029263 A1    Feb. 1, 2018

(30) Foreign Application Priority Data

Feb. 20, 2015    (JP) .................................. 2015-031702

(51) Int. Cl.
*B29C 45/14*    (2006.01)
*G02B 1/04*    (2006.01)
(Continued)

(52) U.S. Cl.
CPC .... *B29C 45/14467* (2013.01); *B29C 33/0022* (2013.01); *B29C 39/10* (2013.01);
(Continued)

(58) Field of Classification Search
None
See application file for complete search history.

(56) References Cited

U.S. PATENT DOCUMENTS 6,264,869 B1 *   7/2001   Notarpietro ......... B29C 45/1671
                                                          264/247
2010/0025869 A1   2/2010  Suzuishi et al.
(Continued)

FOREIGN PATENT DOCUMENTS

| EP | 1077297 A2 * | 2/2001 | ............. E04F 13/08 |
| JP | 2005215269 A * | 8/2005 | |
| JP | 2008-238701 A | 10/2008 | |
| JP | 2009-279790 A | 12/2009 | |
| JP | 2011-084060 A | 4/2011 | |
| JP | 2011-206980 A | 10/2011 | |

(Continued)

OTHER PUBLICATIONS

Machine Translation of JP 2005215269 A, Aug. 2005 (Year: 2005).*
(Continued)

*Primary Examiner* — Edmund H Lee
(74) *Attorney, Agent, or Firm* — Brundidge & Stanger, P.C.

(57) ABSTRACT

A composite (100) comprises: an integrally molded article of two or more function parts (111) made of a cured material of a liquid resin composition and two or more connection parts (112); and a retention part (120) made of a resin composition different from the liquid resin composition and having two or more through-holes (121) or concave parts. The function parts (111) are respectively arranged inside the through-holes (121) or the concave parts of the retention part (120). The connection parts (112) are joined to a surface of the retention part (120).

2 Claims, 13 Drawing Sheets

(51) Int. Cl.
 B29C 69/00 (2006.01)
 G02B 7/02 (2006.01)
 B29C 45/27 (2006.01)
 B29C 33/00 (2006.01)
 B29C 39/10 (2006.01)
 G02B 3/00 (2006.01)
 B29K 83/00 (2006.01)
 B29K 101/12 (2006.01)
 B29L 11/00 (2006.01)

(52) U.S. Cl.
 CPC .. B29C 45/14065 (2013.01); B29C 45/14344 (2013.01); B29C 45/27 (2013.01); B29C 69/001 (2013.01); G02B 1/04 (2013.01); G02B 1/041 (2013.01); G02B 3/0037 (2013.01); G02B 7/022 (2013.01); B29K 2083/00 (2013.01); B29K 2101/12 (2013.01); B29L 2011/0016 (2013.01)

(56) References Cited

U.S. PATENT DOCUMENTS

| | | |
|---|---|---|
| 2011/0063734 A1 | 3/2011 | Sakaki |
| 2011/0313123 A1 | 12/2011 | Kashiwagi |
| 2013/0003199 A1* | 1/2013 | Jeong ............... B29D 11/00375 359/819 |
| 2015/0035180 A1 | 2/2015 | Shen et al. |

FOREIGN PATENT DOCUMENTS

| | | |
|---|---|---|
| JP | 2012-008201 A | 1/2012 |
| JP | 2013-015837 A | 1/2013 |
| JP | 2013-181077 A | 9/2013 |
| WO | 2013/129345 A1 | 9/2013 |

OTHER PUBLICATIONS

Machine Translation of EP 1077297 A2, Feb. 2001 (Year: 2001).*
International Search Report from International Application No. PCT/JP2016/051367 dated Mar. 29, 2016.

* cited by examiner

METHOD OF MANUFACTURING A COMPOSITE

TECHNICAL FIELD

The present invention relates to a composite including at least one functional part composed of a cured product of a liquid resin composition, and a holding part composed of a resin composition which is different from the liquid resin composition and configured to hold the at least one functional part, and a method of manufacturing the composite.

BACKGROUND ART

Currently, in the field of illuminating lamps, electrical products, automobiles and the like where heat resisting property is required, parts of a cured product of a thermosetting resin are used. In addition, injection molding is known as a method of molding a thermosetting resin. In general, however, a cured product of a thermosetting resin is brittle, fragile, and tends to adhere to the metal mold, and therefore, is difficult to release from the mold. In addition, when a thermosetting resin is charged to the cavity of the metal mold, a part of the resin covers the inner wall of the cavity before the resin is sufficiently charged into the cavity, and the resin is further heated and cured, and consequently, bubbles can possibly remain in the molded article in some situation.

When the above-mentioned problems of damaging at the time of releasing and residual bubbles occur, the molded article is difficult to be used as an optical device. In view of this, a method for solving the above-mentioned problems has been proposed (see, for example, PTL 1).

The molded article disclosed in PTL 1 is manufactured by injection molding using a liquid thermosetting resin having a low viscosity. FIGS. 1A and 1B illustrate a configuration of molded article 30 disclosed in PTL 1. FIG. 1A is a plan view, and FIG. 1B is a sectional view taken along line A-A of FIG. 1A. As illustrated in FIG. 1A, molded article 30 is formed in a sheet-like shape. In molded article 30, a plurality of optical device parts 14 are arrayed. Optical device part 14 includes optical function part 11 having an optical function, and outer periphery part 12 disposed outside optical function part 11. Optical function part 11 and outer periphery part 12 are integrally molded. In addition, cutting part 16 for separating optical device parts 14 is provided between optical device parts 14 adjacent to each other.

In the molding of molded article 30, a plurality of optical device parts 14 are integrally molded in one cavity. At this time, the side surfaces (except for the outer surface of optical device part 14 disposed on the outside) of optical device parts 14 make contact with the respective side surfaces of adjacent optical device parts 14, without making contact with the inner wall of the cavity. Accordingly, in comparison with the case where optical device parts 14 are individually molded, the contact area between optical device part 14 and the inner wall of the cavity is small, and the force which is exerted on molded article 30 at the time of releasing is reduced. In addition, depending on the shape and the thickness of outer periphery part 12, the strength of molded article 30 can be increased and concentration of the stress during the molding can be moderated. As a result, deformation and damaging of molded article 30 at the time of releasing can be reduced. Further, the smaller contact area between optical device part 14 and the inner wall of the cavity results in the smaller difference in flow rate between the surface of the resin and the inside of the resin. Thus, residual bubbles in molded article 30 can be reduced. Accordingly, molded article 30 disclosed in PTL 1 can be manufactured without causing damaging at the time of releasing or residual bubbles, and it is possible to efficiently manufacture two or more optical devices by separating optical device parts 14 from molded article 30.

CITATION LIST

Patent Literature

PTL 1
Japanese Patent Application Laid-Open No. 2011-206980

SUMMARY OF INVENTION

Technical Problem

In the invention disclosed in PTL 1, a silicone resin is used as a thermosetting resin. A cured product of a silicone resin is, however, very flexible, and therefore, when sheet-like molded article 30 is manufactured with the silicone resin, molded article 30 is deflected, and cannot be easily handled in an appropriate manner. In view of this, optical device parts 14 cannot possibly be separated with high precision. To solve such a problem, it is conceivable to partially form a thick portion. Formation of a thick part is, however, not suitable for manufacturing of small-sized and thin molded articles. In addition, the material cost is unnecessarily increased when the thick part is formed.

An object of the present invention is to provide a composite which includes an integral molded article of a cured product of a liquid resin composition including two or more functional parts, and is easy to handle after the releasing even when the cured product has a high flexibility. Another object of the present invention is to provide a method of manufacturing a composite including at least one functional part composed of a cured product of a liquid resin composition, and a holding part composed of a resin composition which is different from the liquid resin composition and configured to hold the at least one functional part.

Solution to Problem

A composite according to an embodiment of the present invention includes: two or more functional parts, each of which is composed of a cured product of a liquid resin composition; a connecting part composed of the cured product of the liquid resin composition, the connecting part connecting the two or more functional parts together; and a holding part composed of a resin composition which is different from the liquid resin composition, the holding part including two or more through holes or recesses formed therein. The functional part and the connecting part are integrally molded, the two or more functional parts are respectively disposed in the two or more through holes or recesses, and the connecting part is joined to the holding part.

A composite according to an embodiment of the present invention includes: a first layer composed of a cured product of a liquid resin composition; and a second layer composed of a resin composition which is different from the liquid resin composition. The first layer is formed over a region including: two or more single layer parts that are regions composed only of the first layer, and a multilayer part that is a region in which the first layer and the second layer are joined to each other, the single layer part includes a functional part, and the multilayer part includes: a connecting part composed of the cured product of the liquid resin composition and configured to seamlessly connect the regions of the two or more single layer parts, and a holding part composed of the resin composition and configured to hold the first layer.

In a method of manufacturing a composite according to an embodiment of the present invention, the composite including at least one functional part composed of a cured product of a liquid resin composition, and a holding part composed of a resin composition which is different from the liquid resin composition and configured to hold the at least one functional part, the method comprising: preparing the holding part composed of the resin composition which is different from the liquid resin composition, the holding part including two or more through holes or recesses formed therein; disposing the holding part as an insert member in a metal mold such that the two or more through holes or recesses are communicated with a cavity of the metal mold; and integrally molding two or more functional parts respectively disposed in the two or more through holes or recesses, and a connecting part connecting the two or more functional parts and joined to the holding part by charging a liquid resin composition to the cavity and curing the liquid resin composition.

Advantageous Effects of Invention

According to the present invention, an integral molded article of two or more resin molded articles (functional parts) which is easy to handle after the releasing can be highly efficiently manufactured at low cost. In addition, by cutting the integrally molded article, two or more resin molded articles (functional parts) can be easily manufactured with high precision.

DESCRIPTION OF EMBODIMENTS

Figure 1A:
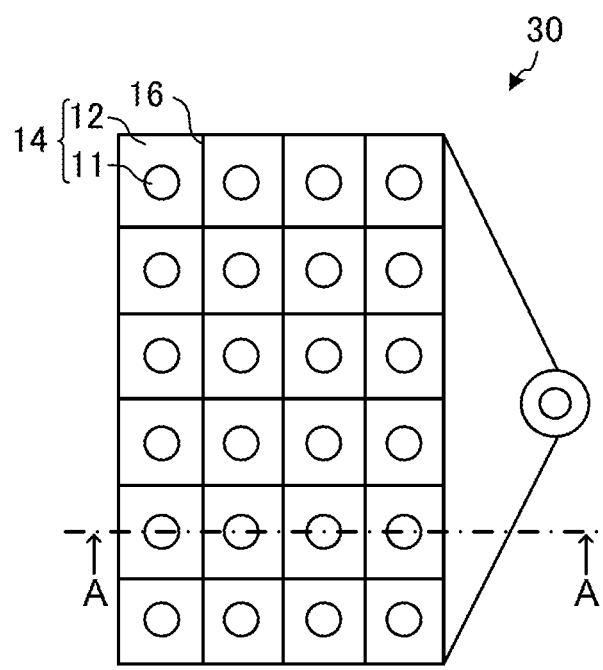
FIGS. 1A and 1B illustrate a configuration of a molded article disclosed in PTL 1.
Figure 1B:
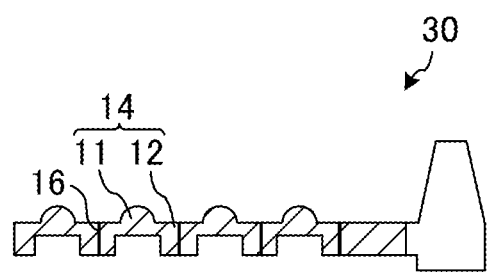
Figure 2A:
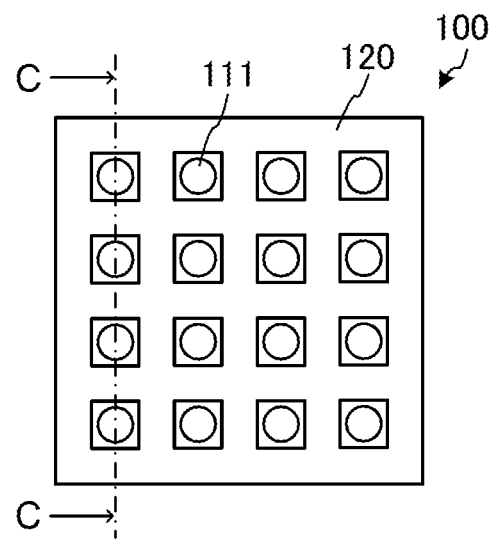
FIGS. 2A to 2C illustrate a configuration of a composite according to an embodiment.
Figure 2B:
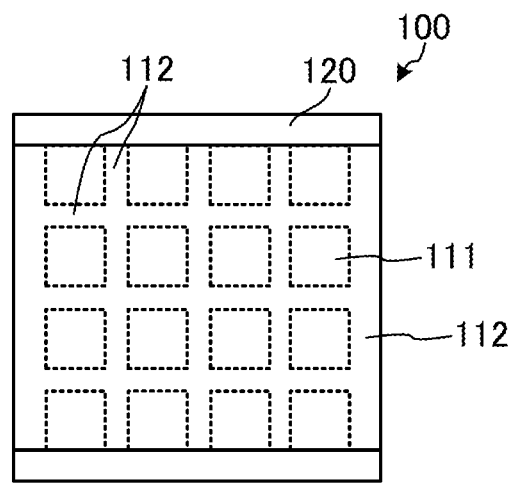
Figure 2C:
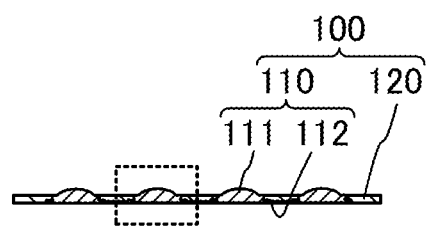
Figure 3:
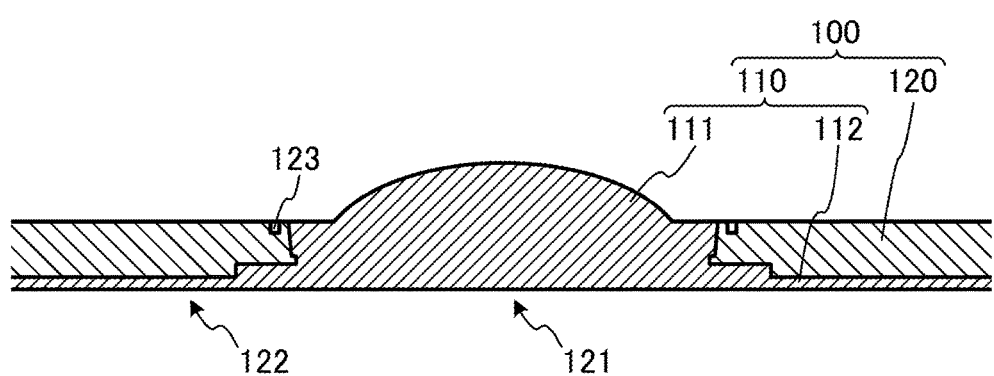
FIG. 3 is a partially enlarged sectional view illustrating a configuration of the composite according to the embodiment.

An embodiment of the present invention is described in detail below with reference to the accompanying drawings.
(Configuration of Composite)
FIGS. 2A to 2C and FIG. 3 illustrate a configuration of composite 100 according to the present embodiment. FIG. 2A is a plan view, FIG. 2B is a bottom view, and FIG. 2C is a sectional view taken along line C-C of FIG. 2A. In addition, FIG. 3 is a partially enlarged sectional view of a region surrounded with a broken line in FIG. 2C.

As illustrated in FIGS. 2A to 2C and FIG. 3, composite 100 according to the present embodiment includes integral molded article 110 including two or more functional parts 111 and connecting part 112, and holding part 120 for holding two or more functional parts 111. Functional part 111 and connecting part 112 are composed of cured products of a liquid resin composition, and holding part 120 is composed of a resin composition which is different from the resin composition of functional part 111 and connecting part 112. In addition, as illustrated in FIG. 2C and FIG. 3, composite 100 includes a layer composed of a cured product of a liquid resin composition, and a layer composed of the above-mentioned resin composition. The layer composed of a cured product of a liquid resin composition is formed over two or more single layer parts and a multilayer part. Here, the single layer part is a region composed only of a layer composed of a cured product of a liquid resin composition. The multilayer part is a region in which a layer composed of a cured product of a liquid resin composition, and a layer composed of the above-mentioned resin composition are joined to each other. The single layer part includes functional part 111, and the multilayer part includes connecting part 112 and holding part 120.

Functional part 111 is a resin member which can be used as various functional parts, and is molded integrally and seamlessly with connecting part 112. In the present embodiment, functional part 111 and connecting part 112 are composed of a transparent cured resin, and functional part 111 can be used as an optical part (for example, a plano-convex lens). In addition, functional part 111 may be disposed only in the single layer part, or over a region including the entirety of the single layer part and a portion adjacent to the single layer part of the multilayer part. In the present embodiment, a plurality of functional parts 111 are disposed in respective through holes 121 of holding part 120 (which correspond to the single layer parts). It is to be noted that the use of functional part 111 is not limited, and functional part 111 may not be an optical part. Examples of the use of functional part 111 include optical parts, general industrial parts, mechanical parts, electronic parts and inner/outer parts of a vehicle. In addition, functional part 111 may have two or more functions. For example, functional part 111 may have an optical function as a main function, and a holder function as an auxiliary function. In this case, the multilayer part located in a region around the single layer part may have a holder function.

The number of functional parts 111 is not limited as long as two or more functional parts 111 are provided. In the present embodiment, integral molded article 110 of a cured product of a liquid resin composition includes arrayed 16 functional parts 111.

Connecting part 112 connects two or more functional parts 111 together, and is joined to holding part 120. In the present embodiment, connecting part 112 is joined to holding part 120 in groove part 122 formed on the rear surface of holding part 120.

The type of the resin composition for forming functional part 111 and connecting part 112 is not limited as long as the resin composition is a liquid curable resin composition which has a low viscosity at the temperature during the molding, and is appropriately selected in accordance with the performance required for functional part 111. Examples of the resin included in the liquid resin composition include a thermosetting resin and a photosetting resin. In the present embodiment, functional part 111 and connecting part 112 are composed of a cured product of a transparent thermosetting resin. Examples of the thermosetting resin include a silicone resin, an epoxy resin and the like.

Holding part 120 is a resin member for holding functional part 111 in which two or more through holes or recesses are formed. In the present embodiment, holding part 120 is a resin plate including arrayed 16 through holes 121, and functions as a tray that holds a plurality of functional parts 111. It is to be noted that holding part 120 may have other functions. For example, in the case where functional part 111 is an optical part, holding part 120 may function as a light shielding plate for blocking light incident on functional part 111 or light emitted from functional part 111. As described later, holding part 120 is composed of a resin composition which is different from the resin composition for forming functional part 111 and connecting part 112. In addition, through holes 121 may be disposed without being arrayed. For example, through holes 121 may be radially disposed around the position of the sprue at the time of injection molding of a liquid resin composition. In this case, composite 100 includes two or more radially disposed functional parts 111.

Figure 4A:
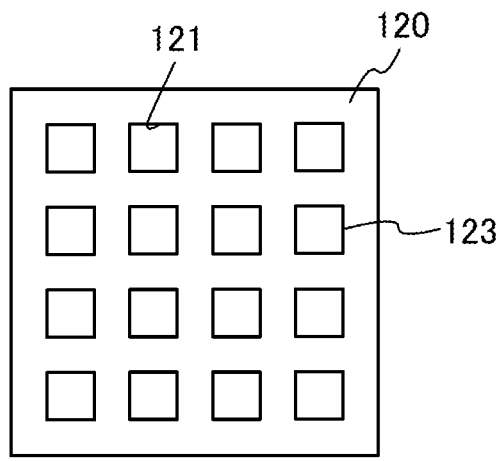
FIGS. 4A and 4B illustrate a configuration of a holding part of the composite according to the embodiment.
Figure 4B:
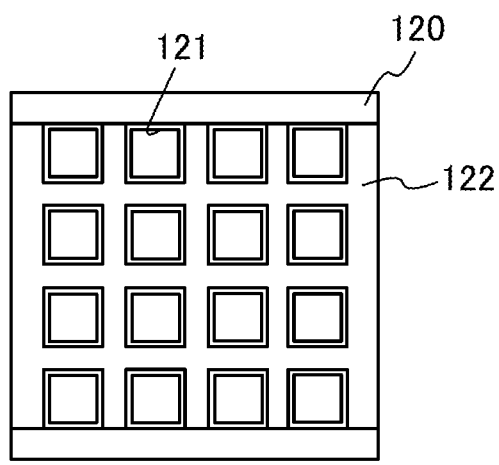

FIGS. 4A and 4B illustrate a configuration of holding part 120. FIG. 4A is a plan view, and FIG. 4B is a bottom view. As illustrated in FIG. 4A and FIG. 4B, holding part 120 includes 16 through holes 121, groove part 122 and flow reducing part 123 (see FIG. 3 for the position of flow reducing part 123 and groove part 122).

Through holes 121 are arrayed such that the opening on the rear surface side of holding part 120 is located in groove part 122. As described above, functional parts 111 are disposed in respective through holes 121. The number of through holes 121 is not limited, and is set in accordance with the number of functional parts 111. In addition, the shape of through hole 121 is not limited, and is set in accordance with the shape of functional part 111. In the present embodiment, through hole 121 has a quadrangular shape in plan view.

Groove part 122 is formed to be communicated with through hole 121 on the surface of holding part 120 on which connecting part 112 is joined. In the present embodiment, as illustrated in FIG. 4B, groove part 122 is formed on the rear surface of holding part 120 such that groove part 122 is communicated with all through holes 121. The multilayer part is formed by joining connecting part 112 to groove part 122 formed in holding part 120. In addition, as described in detail later, groove part 122 functions as a charging hole (a runner for guiding to through hole 121) for charging a liquid resin composition for forming functional part 111 to through hole 121 at the time of manufacturing composite 100. The resin composition remaining in groove part 122 at this time is cured and becomes connecting part 112. Accordingly, connecting part 112 is joined to groove part 122. The depth of groove part 122 is not limited as long as the liquid resin composition can be appropriately charged to through hole 121. For example, groove part 122 has a depth of about 0.1 to 1 mm. It is to be noted that, while groove part 122 is formed in holding part 120 in the present embodiment, the groove part may be formed in a metal mold described later. In this case, at the time of injection molding, the liquid resin composition is charged to through hole 121 of holding part 120 through a groove part formed in the metal mold.

Flow reducing part 123 is a recess formed to surround each through hole 121 (which corresponds to single layer part) on one surface of holding part 120. As illustrated in FIG. 3, in the present embodiment, flow reducing part 123 is a recess having a rectangular cross-sectional shape formed on the front surface (the surface on which groove part 122 is not formed) of holding part 120. As described in detail later, at the time of manufacturing composite 100, flow reducing part 123 reduces leakage of the liquid resin composition to unintended parts. The shape of flow reducing part 123 is not limited as long as the flow of the liquid resin can be suppressed. Examples of the cross-sectional shape of flow reducing part 123 include a triangular shape (see FIG. 13), a semicircular shape, and a trapezoidal shape.

Holding part 120 may further include a structure (hereinafter referred to as "positioning part") for positioning holding part 120 with respect to the metal mold. The shape of the positioning part is not limited as long as holding part 120 can be positioned with respect to the metal mold. Examples of the shape of the positioning part formed in holding part 120 and the metal mold include a through hole, a recess and a protrusion.

Figure 5A:
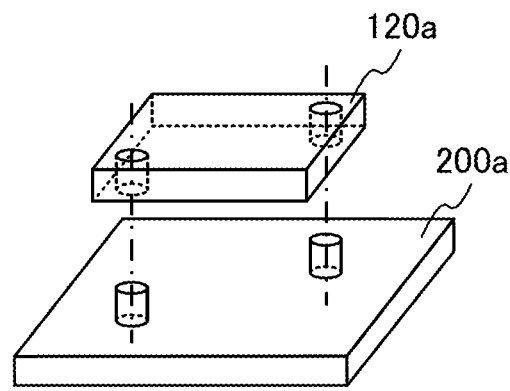
FIGS. 5A to 5C are schematic views illustrating a configuration of a positioning structure in the holding part and a metal mold.
Figure 5B:
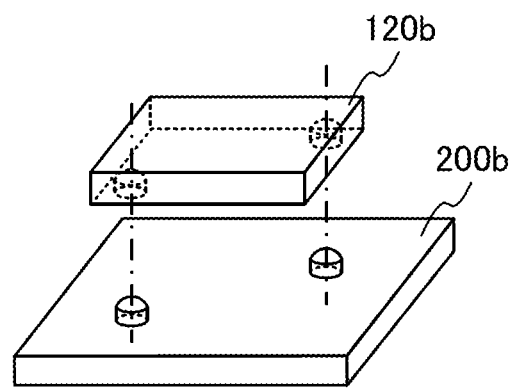
Figure 5C:
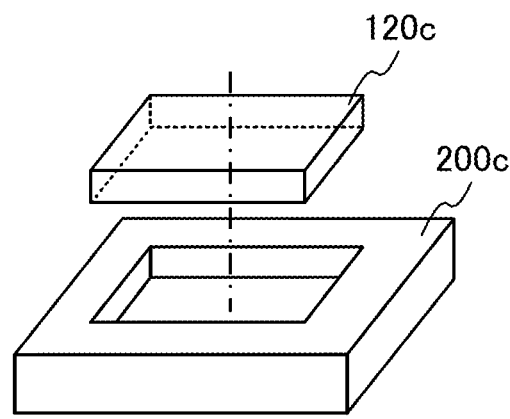

FIGS. 5A to 5C are schematic views illustrating an exemplary configuration of the positioning structure in holding part 120 and the metal mold. In the example illustrated in FIG. 5A, protrusions are formed in metal mold 200a, and through holes to which the protrusions can be fit are formed in holding part 120a. In the example illustrated in FIG. 5B, protrusions are formed in holding part 120b, and recesses to which the protrusions can be fit are formed in metal mold 200b. In the example illustrated in FIG. 5C, holding part 120c is fitted to a recess for positioning of holding part 120c which is formed in metal mold 200c.

As described above, holding part 120 is composed of a resin composition which is different from the resin composition for forming functional part 111 and connecting part 112. The holding part is used as an insert member at the time when functional part 111 and connecting part 112 are molded by liquid injection molding (LIM), and therefore the resin composition of holding part 120 preferably has a heat resisting property enough to prevent deformation at the time when functional part 111 and connecting part 112 are molded by liquid injection molding. To be more specific, preferably, the deflection temperature under load of the resin composition of holding part 120 is higher than the molding temperature (for example, 150° C.) of functional part 111 and connecting part 112. Examples of the resin of the resin composition of holding part 120 include a thermoplastic resin, a thermosetting resin and a photosetting resin. From a view point of productivity, the resin of the resin composition of holding part 120 is preferably a thermoplastic resin. Examples of the thermoplastic resin include polyetherimide (PEI), polyether sulfone (PES), polyphenylene sulfide (PPS), polyamide 6T (PA6T) and polybutylene terephthalate (PBT).

(Configuration of Metal Mold)

Next, metal mold 200 that is used for manufacturing composite 100 by liquid injection molding (LIM) using an insert member is described.

Figure 6:
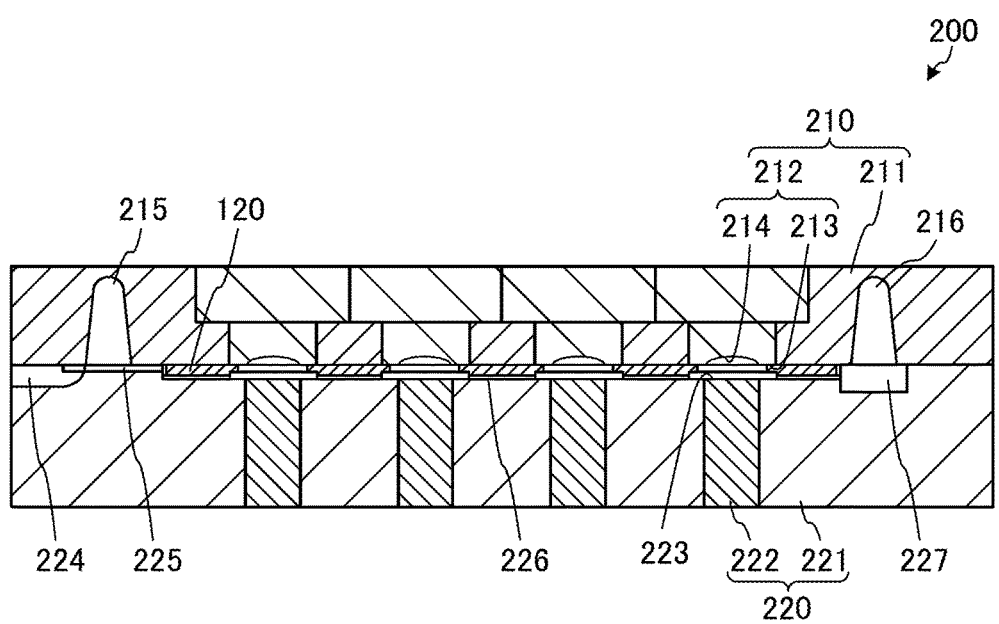
FIG. 6 is a schematic cross-sectional view for illustrating a structure of a metal mold.

FIG. 6 is a schematic cross-sectional view illustrating a structure of metal mold 200. In FIG. 6, holding part 120 as an insert member is disposed in a cavity of metal mold 200.

As illustrated in FIG. 6, metal mold 200 includes first metal mold 210 and second metal mold 220. It is to be noted that, although not illustrated in the drawings, metal mold 200 is configured to be connectable to an injection device including a material supplying device, a material mixing device, a nozzle and the like. With this configuration, the injection device can charge the liquid resin composition into the cavity of mold-clamped metal mold 200 (first metal mold 210 and second metal mold 220). In addition, as described above, first metal mold 210 and second metal mold 220 may include a structure for positioning holding part 120 that is disposed in the cavity.

First metal mold 210 is a metal mold piece for molding the front side (the convex surface side of a planoconvex lens) of functional part 111. First metal mold 210 includes first metal mold main body 211 and 16 convex surface molding parts 212 (FIG. 6 illustrates only four convex surface molding parts 212).

First metal mold main body 211 is a metal mold piece for holding convex surface molding part 212. Two recesses, first charging part 215 and second charging part 216, where the liquid resin composition can be charged when first metal mold 210 and second metal mold 220 are mold-clamped are formed in first metal mold main body 211.

Convex surface molding part 212 is a metal mold piece for molding the front side of functional part 111 (the convex surface side of a planoconvex lens). Convex surface molding part 212 includes first plane 213 and convex surface transferring surface 214. First plane 213 is a surface disposed to oppose second metal mold 220. Convex surface transferring surface 214 is an internal surface of a recess formed at a center portion of first plane 213. Convex surface transferring surface 214 is formed in a shape corresponding to the convex surface of functional part 111 (planoconvex lens).

Second metal mold 220 is a metal mold piece for molding the rear side of functional part 111 (the plane side of a planoconvex lens). Second metal mold 220 includes second metal mold main body 221 and 16 plane molding parts 222 (FIG. 6 illustrates only four plane molding parts 222).

Second metal mold main body 221 is a metal mold piece for holding plane molding part 222. Two recesses and a groove where the liquid resin composition can be charged when first metal mold 210 and second metal mold 220 are mold-clamped are formed in second metal mold main body 221. Two recesses function as first charging hole 224 and fourth charging hole 227, and the groove serves as second charging hole 225 and third charging hole 226. It is to be noted that, while holding part 120 is disposed in the groove that serves as third charging hole 226, through hole 121 and groove part 122 of holding part 120 where the liquid resin composition is charged are not closed with metal mold 200 (first metal mold 210 and second metal mold 220) when holding part 120 is disposed in the groove that serves as third charging hole 226.

Plane molding part 222 is a metal mold piece for molding the rear side of functional part 111 (the plane side of a planoconvex lens). Plane molding part 222 includes plane transferring surface 223. In the present embodiment, plane transferring surface 223 is formed in a plane shape corresponding to the plane of functional part 111.

It is to be noted that, as described above, the groove part may be formed in second metal mold 220. In this case, the groove part formed in second metal mold 220 functions as a runner for charging the liquid resin to through hole 121.

As illustrated in FIG. 6, when the above-described first metal mold 210 and second metal mold 220 are mold-clamped, the recess formed in first metal mold main body 211, and the groove and the and recess formed in second metal mold main body 221 are covered with each other, and thus first charging hole 224, second charging hole 225, first charging part 215, third charging hole 226, fourth charging hole 227 and second charging part 216 are formed. First charging hole 224 is communicated with second charging hole 225, second charging hole 225 is communicated with first charging part 215 and third charging hole 226, third charging hole 226 is communicated with fourth charging hole 227, and fourth charging hole 227 is communicated with second charging part 216.

When a liquid resin composition is introduced to metal mold 200 from an injection device not illustrated in the drawing, the liquid resin composition is charged to first charging hole 224, second charging hole 225, first charging part 215, third charging hole 226, fourth charging hole 227 and second charging part 216 in this order.

(Method of Manufacturing Composite)

Figure 7:
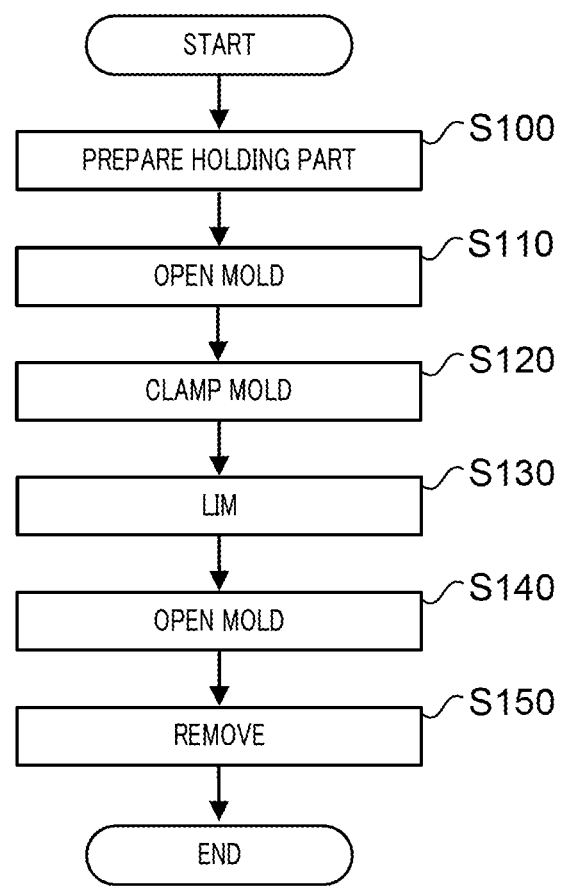
FIG. 7 is a flowchart of an exemplary method of manufacturing the composite according to the embodiment.

Next, a method of manufacturing composite 100 using the above-mentioned metal mold 200 is described. FIG. 7 is a flowchart of an exemplary method of manufacturing composite 100 according to the present embodiment. FIG. 8 and FIG. 9 are schematic cross-sectional views for describing a manufacturing process of composite 100.

First, the above-described holding part 120 is prepared (step S100). The method of manufacturing holding part 120 is not limited. For example, holding part 120 is manufactured by injection molding using a thermoplastic resin.

Figure 8A:
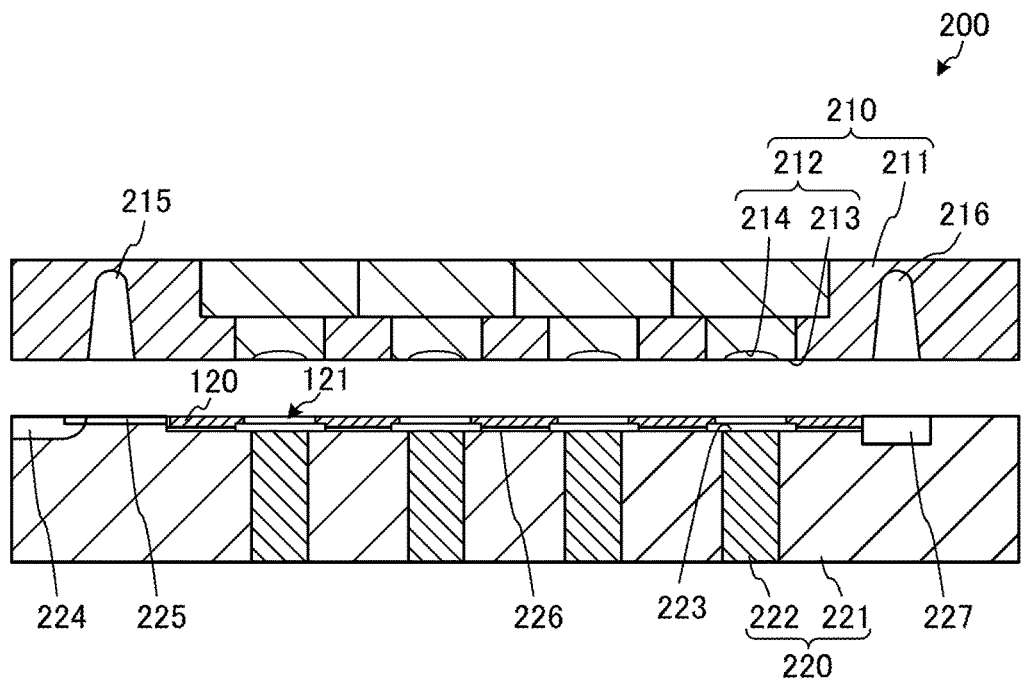
FIGS. 8A and 8B are schematic cross-sectional views for describing a manufacturing process of the composite according to the embodiment.

Next, as illustrated in FIG. 8A, metal mold 200 is opened. Then, prepared holding part 120 is disposed in the groove that serves as third charging hole 226 when first metal mold 210 and second metal mold 220 are mold-clamped (step S110). At this time, holding part 120 is disposed such that through hole 121 of holding part 120 is located above plane molding part 222 of second metal mold 220.

Figure 8B:
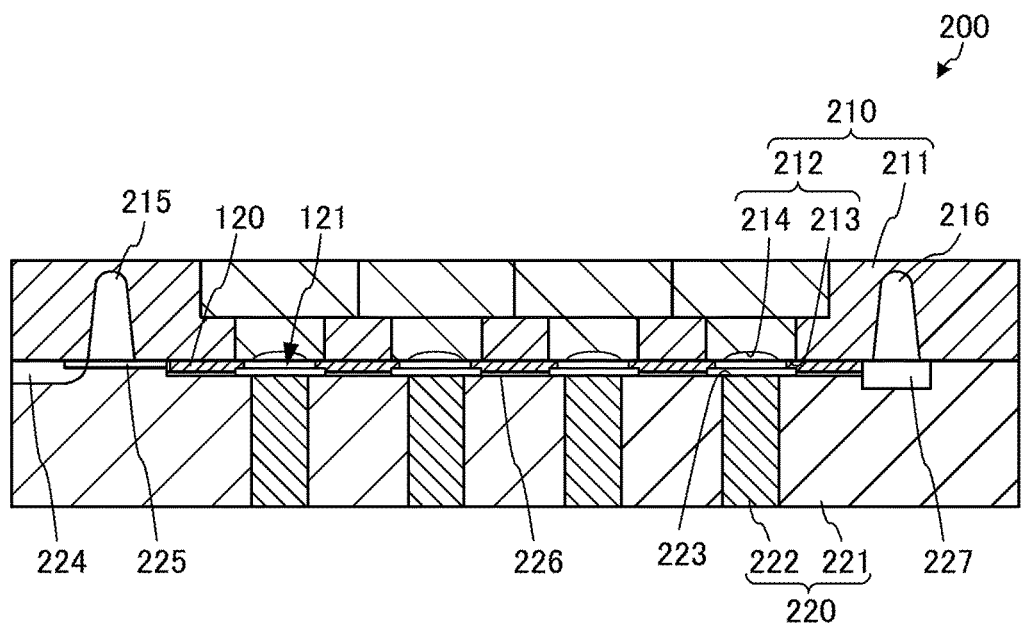

Next, as illustrated in FIG. 8B, second metal mold 220 in which holding part 120 is disposed, and first metal mold 210 are mold-clamped (step S120). At this time, first metal mold 210 is disposed above second metal mold 220 such that convex surface molding part 212 is opposite to plane molding part 222 of second metal mold 220 through through hole 121 of holding part 120. In this manner, holding part 120 is disposed in metal mold 200 such that through hole 121 is communicated with the cavity of metal mold 200, or in other words, that through hole 121 opens to the cavity of metal mold 200.

Figure 9A:
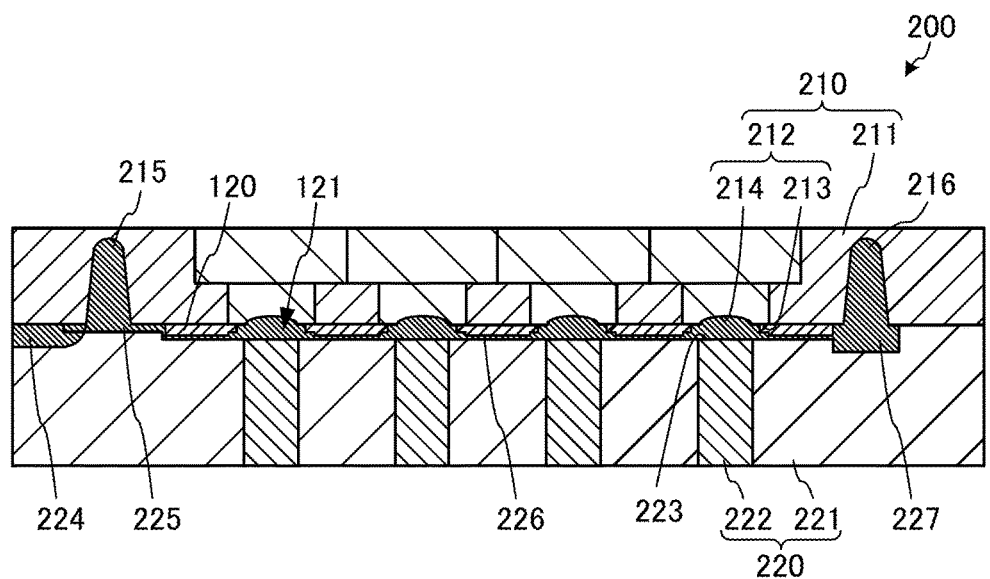
FIGS. 9A and 9B are schematic cross-sectional views for describing a manufacturing process of the composite according to the embodiment.

Next, as illustrated in FIG. 9A, the liquid resin composition is charged to the cavity and through hole 121 of holding part 120, and cured (LIM; step S130). To be more specific, by use of an injection device, the liquid resin composition is charged to the cavity of metal mold 200 that is heated to a predetermined temperature. At this time, the liquid resin composition injected from the injection device is charged to first charging hole 224, second charging hole 225 and first charging part 215 in this order. The liquid resin having reached third charging hole 226 through second charging hole 225 is charged to the cavity and through hole 121 through groove part 122 formed in holding part 120 while being brought into contact with holding part 120. Finally, the liquid resin is charged to fourth charging hole 227 and second charging part 216.

The liquid resin charged to the cavity is heated and thermally cured by metal mold 200. The temperature (molding temperature) of first metal mold 210 and second metal mold 220 may be appropriately set in consideration of the deflection temperature under load of the resin of holding part 120, the flow rate and the flow distance of the liquid resin composition and the like. For example, the temperature of first metal mold 210 and second metal mold 220 is about 130 to 200° C. In addition, the charging duration and the charging pressure of the liquid resin composition may be appropriately set. For example, the charging duration and the charging pressure of the liquid resin composition may be set to about 0.3 to 3 seconds and about 13 MPa, respectively.

Figure 9B:
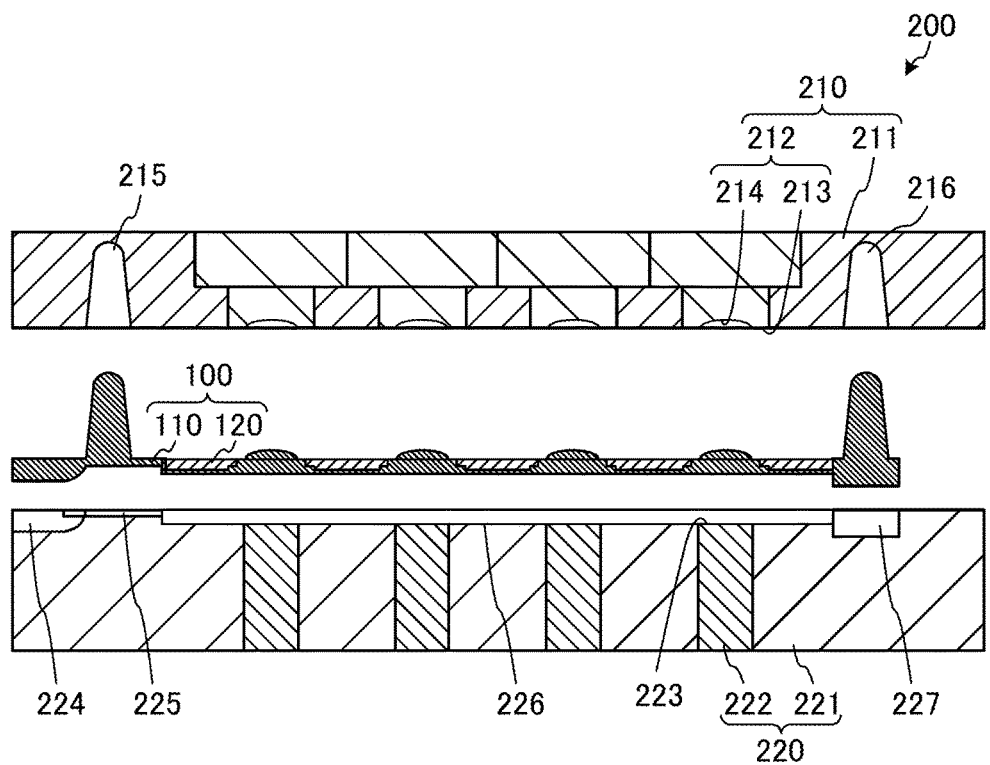
Figure 10A:
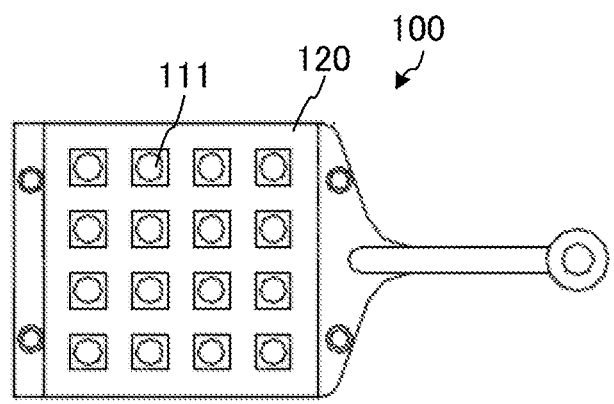
FIGS. 10A to 10C illustrate a configuration of the composite immediately after releasing.
Figure 10B:
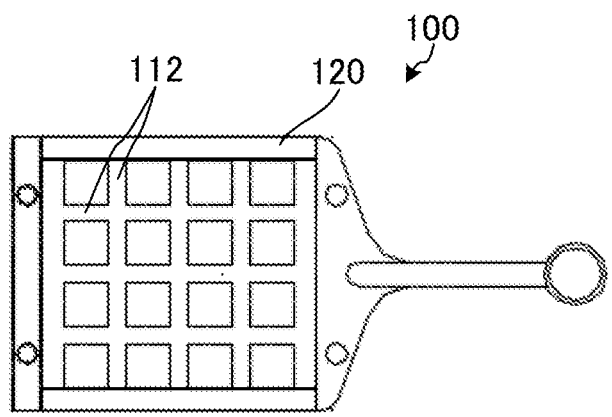
Figure 10C:
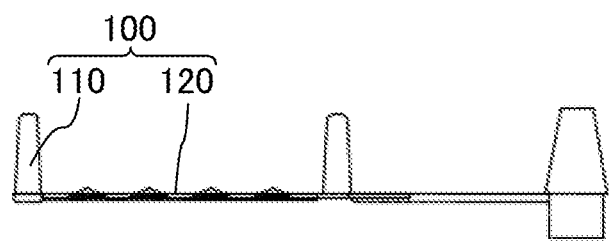

Finally, as illustrated in FIG. 9B, metal mold 200 is opened (step S140), and composite 100 composed of holding part 120 and integral molded article 110 (functional part 111 and connecting part 112) of a cured product of a liquid resin composition joined to each other is removed (step S150). FIGS. 10A to 10C illustrate a configuration of composite 100 immediately after the releasing. FIG. 10A is a plan view, FIG. 10B is a bottom view, and FIG. 10C is a side view. Composite 100 can be used as a product even immediately after the releasing.

Through the above-mentioned procedure, composite 100 including holding part 120 and integral molded article 110 (functional part 111 and connecting part 112) of a cured product of liquid resin can be manufactured. The molding of steps S100 to S150 can be carried out in about 30 seconds to 5 minutes.

In the method of manufacturing composite 100 according to the present embodiment, a secondary processing may be further carried out as a step as appropriate. For example, it is possible to cut a cured product of a liquid resin composition protruding outward from the outer edge of holding part 120 in ejected composite 100 (gate cut; see and compare FIGS. 2A to 2C and FIGS. 10A to 10C). Composite 100 can be used as a product also after the gate cut.

In addition, when functional part 111 (planoconvex lens) is separated from the obtained composite 100, two or more functional parts 111 (planoconvex lens) can be efficiently obtained. The method of separating functional part 111 from composite 100 is not limited. For example, functional part 111 may be separated from holding part 120 by punching, or only connecting part 112 (cutting at the single layer part) or connecting part 112 and holding part 120 (cutting at the multilayer part) may be cut at positions between each functional part 111. In the case where the separated body including one functional part 111 obtained in the above-mentioned manner is considered a composite as an end product, composite 100 prior to the separation including two or more functional parts 111 can be considered a composite as an intermediate (composite intermediate).

Figure 11A:
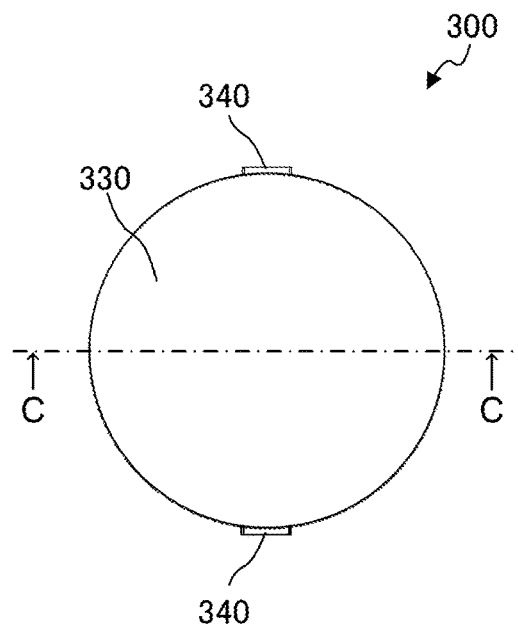
FIGS. 11A to 11C illustrates a configuration of an optical part.
Figure 11B:
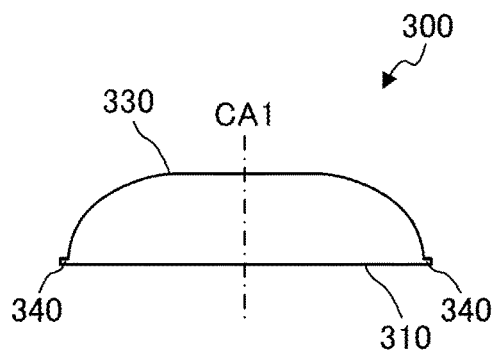
Figure 11C:
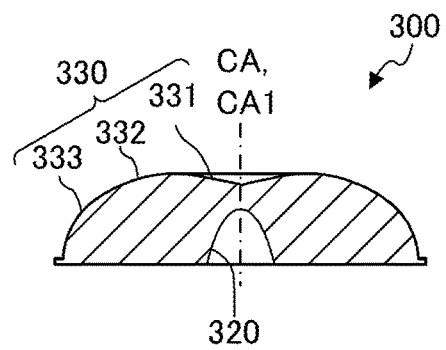

While functional part 111 is a planoconvex lens in the above-mentioned example, the shape of functional part 111 is not limited. The shapes of holding part 120 and the metal mold pieces of the metal mold 200 are designed in accordance with the shape of functional part 111. FIGS. 11A to 11C illustrate a configuration of optical part 300 as another exemplary functional part 111. FIG. 11A is a plan view, FIG. 11B is a side view, and FIG. 11C is a sectional view taken along line C-C of FIG. 11A.

As illustrated in FIGS. 11A to 11C, optical part 300 is a light flux controlling member that controls the distribution of light emitted from the light source. Optical part 300 includes rear surface 310, incidence surface 320 and emission surface 330. Optical part 300 has a nearly circular shape in plan view, and is essentially a body of revolution whose rotational axis is central axis CA1. Connection track 340 of the connecting part remains at a part of emission surface 330.

Rear surface 310 is the bottom side surface of optical part 300. The shape of the rear surface 310 is not limited. Regarding the shape of rear surface 310, a plurality of projected lines are formed in matrix in the present embodiment although not illustrated in the drawings. A recess whose internal surface serves as incidence surface 320 is formed at a center portion of rear surface 310.

Light emitted from the light source is incident on incidence surface 320. Incidence surface 320 is an internal surface of a recess opening at rear surface 310. Incidence surface 320 is a rotationally symmetrical surface, and central axis CA of incidence surface 320 and central axis CA1 of optical part 300 coincide with each other.

Emission surface 330 emits the light incident on incidence surface 320 to the outside of optical part 300. Emission surface 330 includes first emission surface 331 located in a predetermined range around the central axis of emission surface 330, second emission surface 332 continuously formed at the periphery of first emission surface 331, and third emission surface 333 that connects second emission surface 332 and rear surface 310. First emission surface 331 has a smooth curved surface projecting to the lower side (light source side). Second emission surface 332 has an annular protruding shape. Third emission surface 333 is a curved surface located at the periphery of second emission surface 332.

(Effect)

Composite 100 according to the present embodiment includes not only integral molded article 110 of a cured product of a liquid resin composition including functional part 111 but also holding part 120 that holds functional part 111. Therefore, with the support of holding part 120, composite 100 can be easily handled without causing deflection even when functional part 111 and connecting part 112 are formed with a flexible cured product of a silicone resin or the like. Accordingly, functional part 111 can be separated from composite 100 with high precision, and two or more resin molded articles (in the present embodiment, optical parts) can be easily manufactured with high precision.

In addition, when the resin part has a small thickness in the case where a metal insert member is used in injection molding of a thermosetting resin by insert molding, it is considered that the flow state in the cavity is difficult to maintain since the thermosetting resin is quickly cured. As a result, it is difficult to obtain a resin molded article having a favorable external appearance. In contrast, holding part 120 according to the present embodiment is composed of a resin composition having a heat insulating property, and therefore the thermosetting rate of the liquid resin composition by the insert member (holding part 120) can be expected to be advantageously moderated. As a result, the flow state of the liquid resin composition in the cavity is maintained, and a cured product of a liquid resin composition can be appropriately molded even when integral molded article 110 of the cured product of the liquid resin composition has a small thickness. In addition, since the volume for charging the liquid resin composition can be set to a small value by disposing the insert member in the cavity, the amount of the gas ejected from the resin during the molding can be reduced, and the ease of the molding can be expected to be increased.

In addition, with the method of manufacturing composite 100 according to the present embodiment, leakage of the liquid resin composition between first metal mold 210 and holding part 120 can be suppressed since holding part 120 is provided with flow reducing part 123. In addition, even when the liquid resin composition reaches flow reducing part 123, holding part 120 and integral molded article 110 of a cured product of a liquid resin composition can be further firmly joined to each other by anchor effect. Accordingly, it is possible to prevent holding part 120 and integral molded article 110 of a cured product of a liquid resin composition from being peeled off at the time of releasing.

Figure 12A:
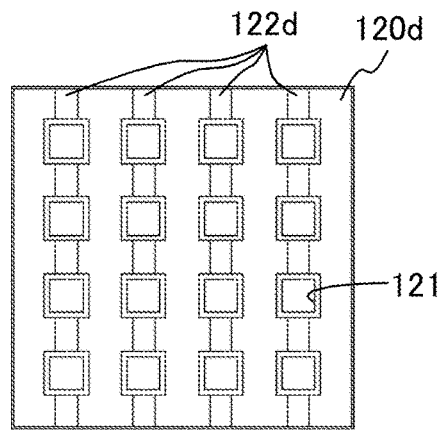
FIGS. 12A to 12C are bottom views illustrating another exemplary shape of the holding part (groove part)
Figure 12B:
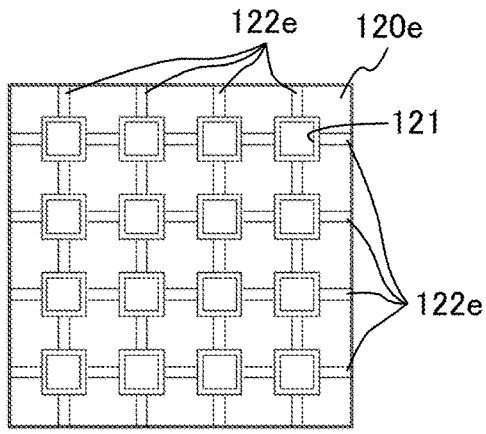
Figure 12C:
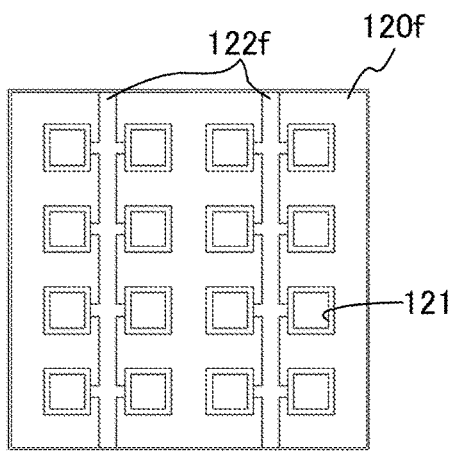

It is to be noted that the shape of the groove part of the holding part in the composite according to the embodiment of the present invention is not limited to the shape of groove part 122 of holding part 120 of the embodiment. FIGS. 12A to 12C are bottom views illustrating other examples of holding parts 120d, 120e and 120f. As illustrated in FIG. 12A, groove part 122d of holding part 120d may be extended only in a first direction (the vertical direction in the drawing). In addition, as illustrated in FIG. 12B, groove part 122e of holding part 120e may be extended in both of a first direction (the vertical direction in the drawing) and a second direction (the lateral direction in the drawing). Further, as illustrated in FIG. 12C, groove part 122f of holding part 120f may be composed of a first groove part that is extended in a first direction (the vertical direction in the drawing) and is not connected with through hole 121, and a second groove part that is extended in a second direction (the lateral direction in the drawing) and connects the first groove part and through hole 121. The composite including holding parts 120d, 120e and 120f includes, in addition to the single layer part and the multilayer part, a second single layer part (a portion where connecting part 112 is not joined in holding parts 120d, 120e and 120f) of a resin composition disposed between the single layer part and the multilayer part. The multilayer part is formed by joining connecting part 112 to groove parts 122d, 122e and 122f formed in holding parts 120d, 120e and 120f. A groove part that functions as a runner for charging the liquid resin composition to through hole 121 is formed to have a small width in a range enough for charging of resin as groove parts 122d, 122e and 122f as mentioned above, and thus the amount of the liquid resin composition can be saved.

Figure 13A:
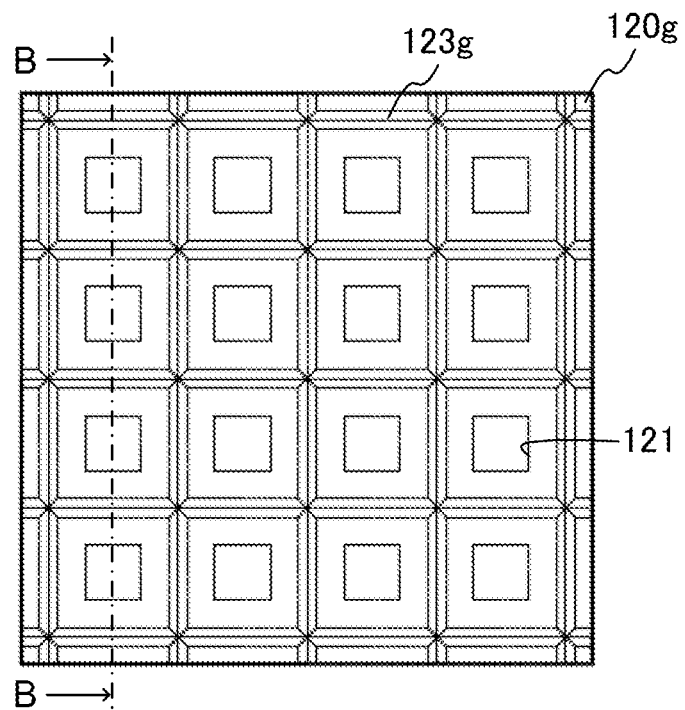
FIGS. 13A and 13B illustrate another exemplary shape of the holding part (flow reducing part).
Figure 13B:

In addition, the shape of the flow reducing part of the holding part in the composite according to the embodiment of the present invention is not limited to the shape of flow reducing part 123 of holding part 120 according to the embodiment. FIGS. 13A and 13B illustrate another exemplary holding part 120. FIG. 13A is a plan view of holding part 120g, and FIG. 13B is a sectional view taken along line B-B of FIG. 13A. As illustrated in FIG. 13A and FIG. 13B, flow reducing part (cutout part) 123g may be a recess having a triangular cross-sectional shape formed to surround through hole 121. By cutting holding part 120g at the valley part of cutout part 123g having a triangular cross-sectional shape, holding part 120g can function as a holder that holds functional part 111 formed in through hole 121 through connecting part 112.

While composite 100 includes holding part 120 in which two or more through holes 121 are formed in the present embodiment, two or more recesses may be formed in place of two or more through holes 121 in holding part 120 of composite 100 according to the embodiment of the present invention. In this case, functional part 111 is disposed in the recess, and groove part 122 is formed on the surface on the side same as that of the recess of holding part 120.

While holding part 120 includes groove part 122 in the present embodiment, holding part 120 according to the embodiment of present invention may not include groove part 122. In this case, at the time of molding of composite 100, holding part 120 is disposed with a gap such that a liquid resin composition can flow through a space between the inner wall of metal mold 200 and holding part 120.

While holding part 120 includes flow reducing part 123 in the present embodiment, holding part 120 according to the embodiment of the present invention may not include flow reducing part 123.

This application is entitled to and claims the benefit of Japanese Patent Application No. 2015-031702 filed on Feb. 20, 2015, the disclosure each of which including the specification, drawings and abstract is incorporated herein by reference in its entirety.

INDUSTRIAL APPLICABILITY

The composite according to the embodiment of the present invention is applicable to, for example, a light flux controlling member and the like for controlling the light distribution of light emitted from the light source in a backlight of a liquid crystal display apparatus, a generally-used illumination apparatus and the like.

REFERENCE SIGNS LIST

11 Optical function part
14 Optical device part
12 Outer periphery part
16 Cutting part
30 Molded article
100 Composite
110 Integral molded article of a cured product of a liquid resin composition
111 Functional part
112 Connecting part
120, 120a to g Holding part
121 Through hole
122, 122d to f Groove part
123, 123g Flow reducing part (Cutout part)
200, 200a to c Metal mold
210 First metal mold
211 First metal mold main body
212 Convex surface molding part
213 First plane
214 Convex surface transferring surface
215 First charging part
216 Second charging part
220 Second metal mold
221 Second metal mold main body
222 Plane molding part
223 Plane transferring surface
224 First charging hole
225 Second charging hole
226 Third charging hole
227 Fourth charging hole
300 Optical part
310 Rear surface
320 Incidence surface
330 Emission surface
331 First emission surface
332 Second emission surface
333 Third emission surface
340 Connection track
CA Central axis of incidence surface
CA1 Central axis of optical part

The invention claimed is:

1. A method of manufacturing a composite, the composite including at least one functional part including a cured product of a liquid resin composition, and a holding part including a resin composition which is different from the liquid resin composition and configured to hold the at least one functional part, the method comprising:
    preparing the holding part including the resin composition which is different from the liquid resin composition, the holding part further including two or more through holes or recesses formed therein;
    disposing the holding part as an insert member in a metal mold such that the two or more through holes or recesses are communicated with a cavity of the metal mold; and
    integrally molding two or more functional parts, respectively disposed in the two or more through holes or recesses, and a connecting part connecting the two or more functional parts and joined to the holding part by charging a liquid resin composition to the cavity and curing the liquid resin composition, wherein:
    the holding part further includes one or more groove parts formed to be communicated with the two or more through holes or recesses on a surface on which the connecting part is joined, the one or more groove parts being configured to be capable of functioning as a runner for guiding the liquid resin composition to the two or more through holes or recesses, and
    wherein the integrally molding the two or more functional parts and the connecting part, the liquid resin composition is charged to the cavity through the one or more groove parts.

2. The method according to claim 1 further comprising cutting the connecting part and the holding part at a position between the functional parts adjacent to each other.

* * * * *